Dec. 14, 1971   M. T. FARQUHAR   3,627,541
METHOD OF PACKAGING A FOOD PRODUCT IN A CARTON
Original Filed Nov. 21, 1968   4 Sheets-Sheet 2
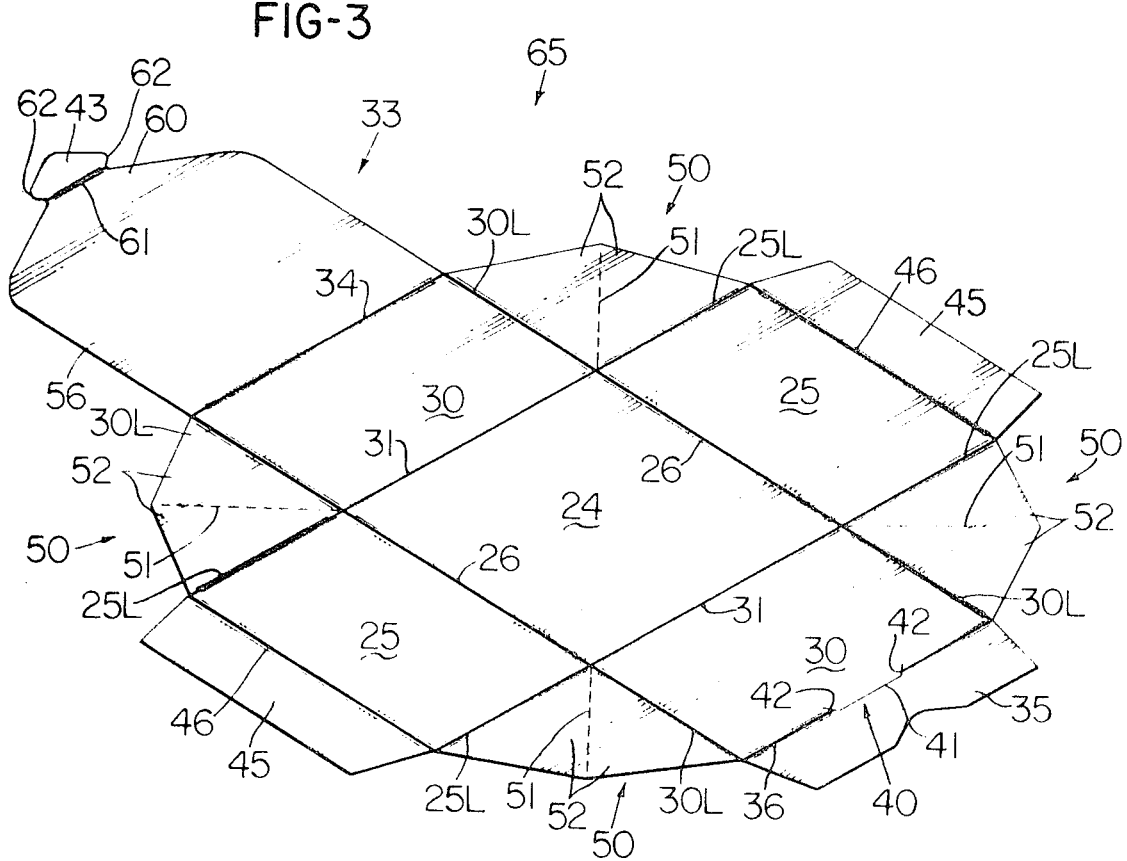
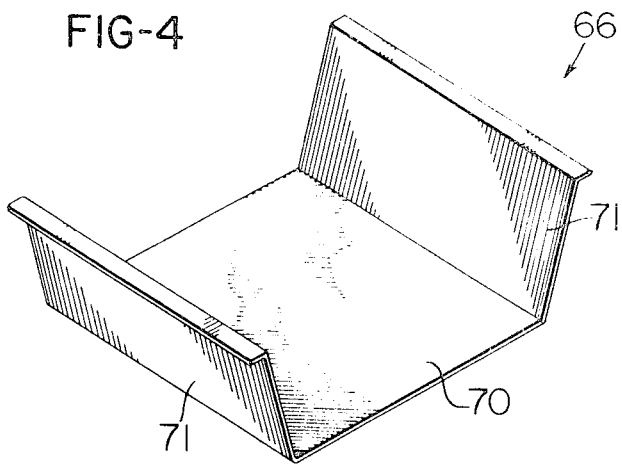
INVENTOR.
MELVILLE T. FARQUHAR
HIS ATTORNEYS

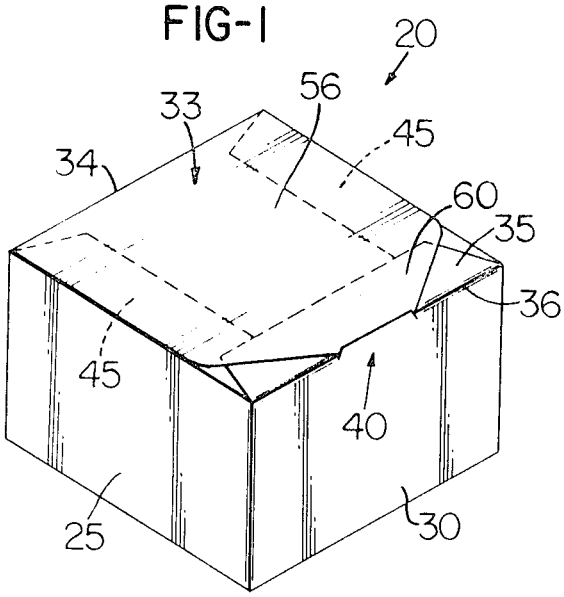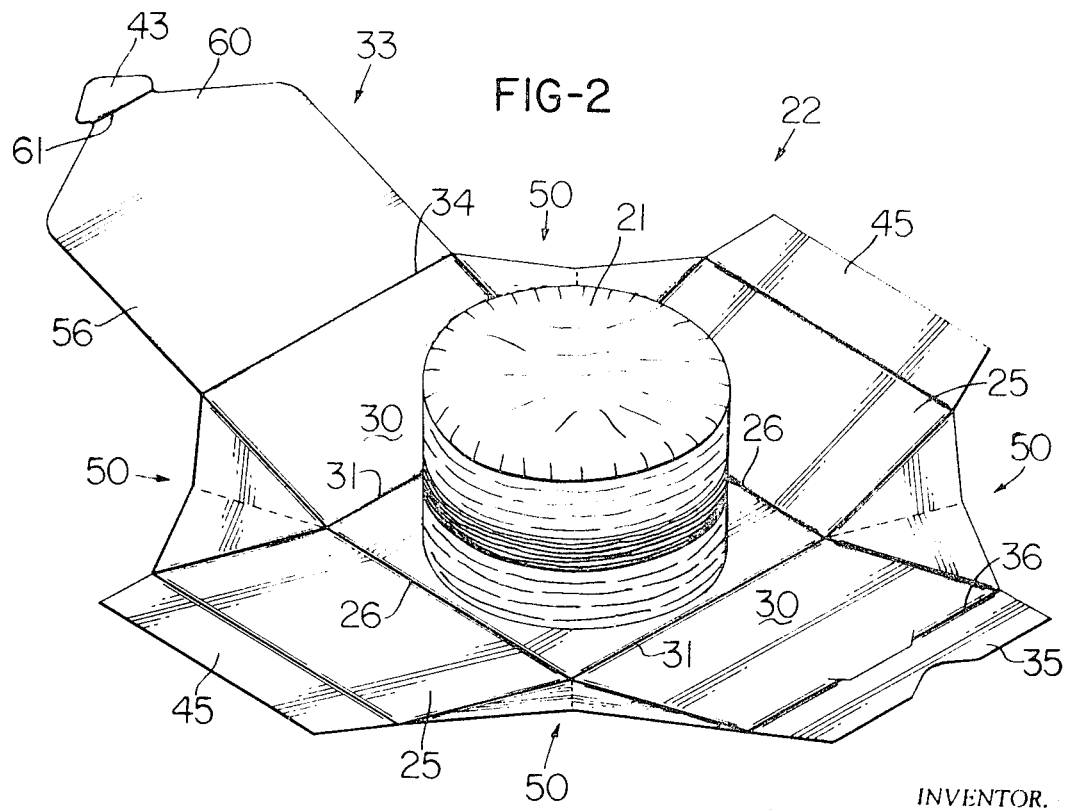

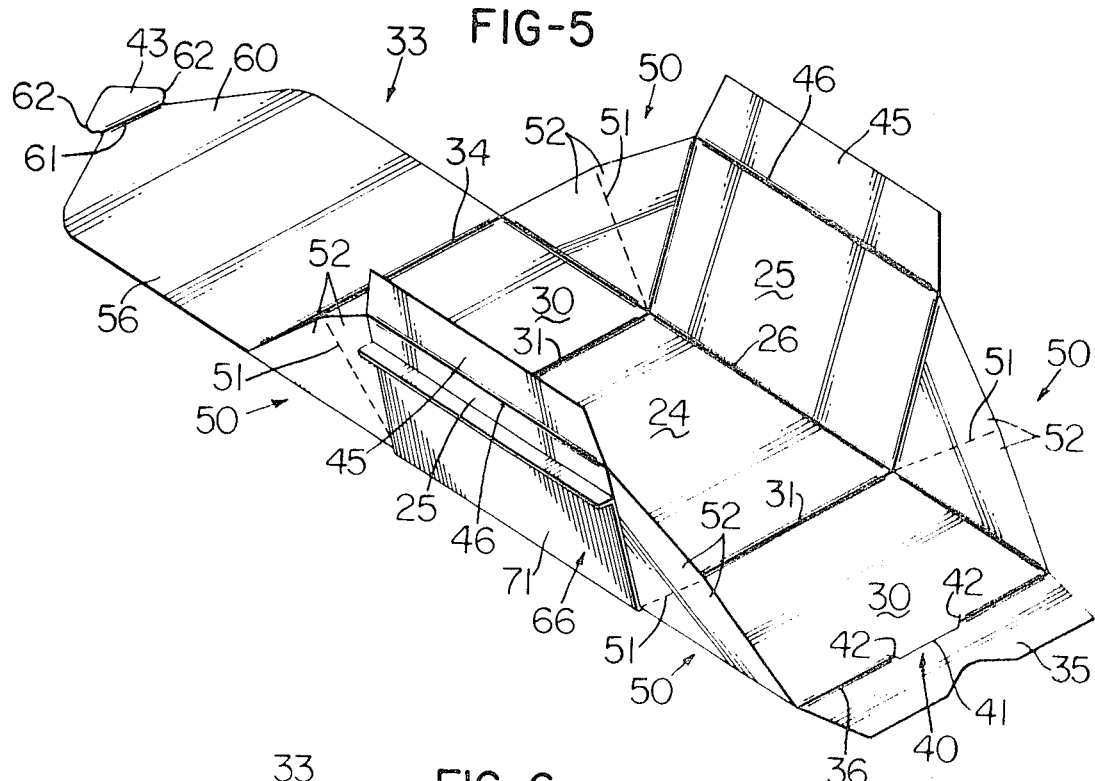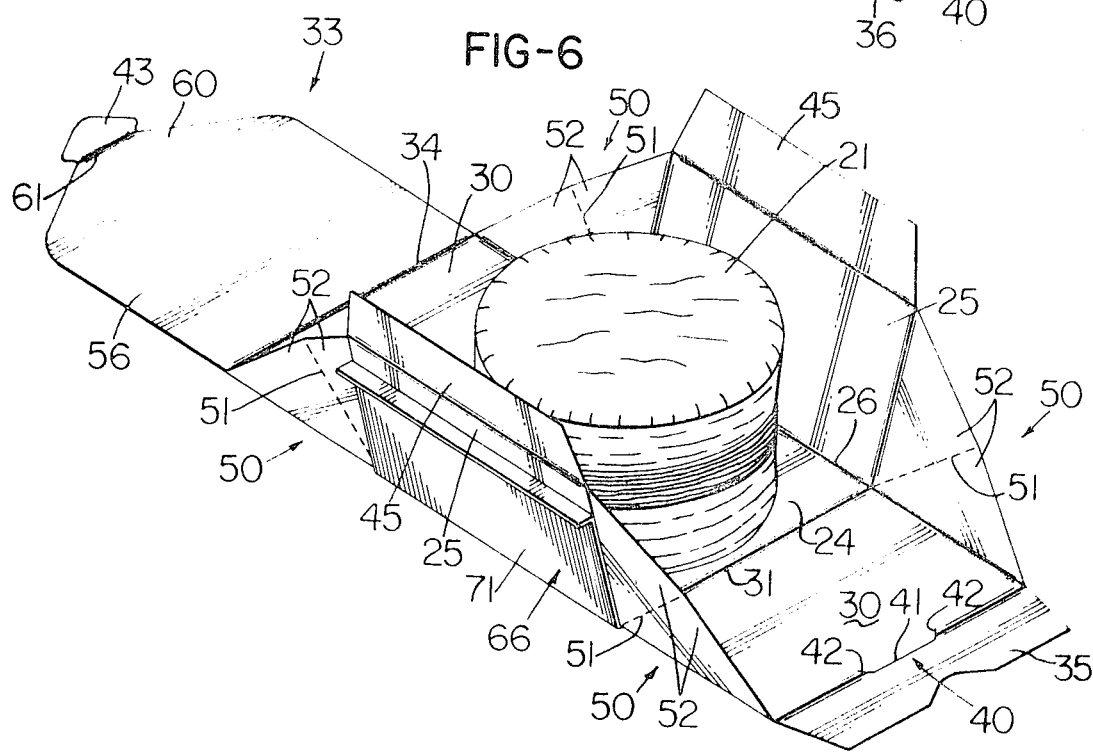

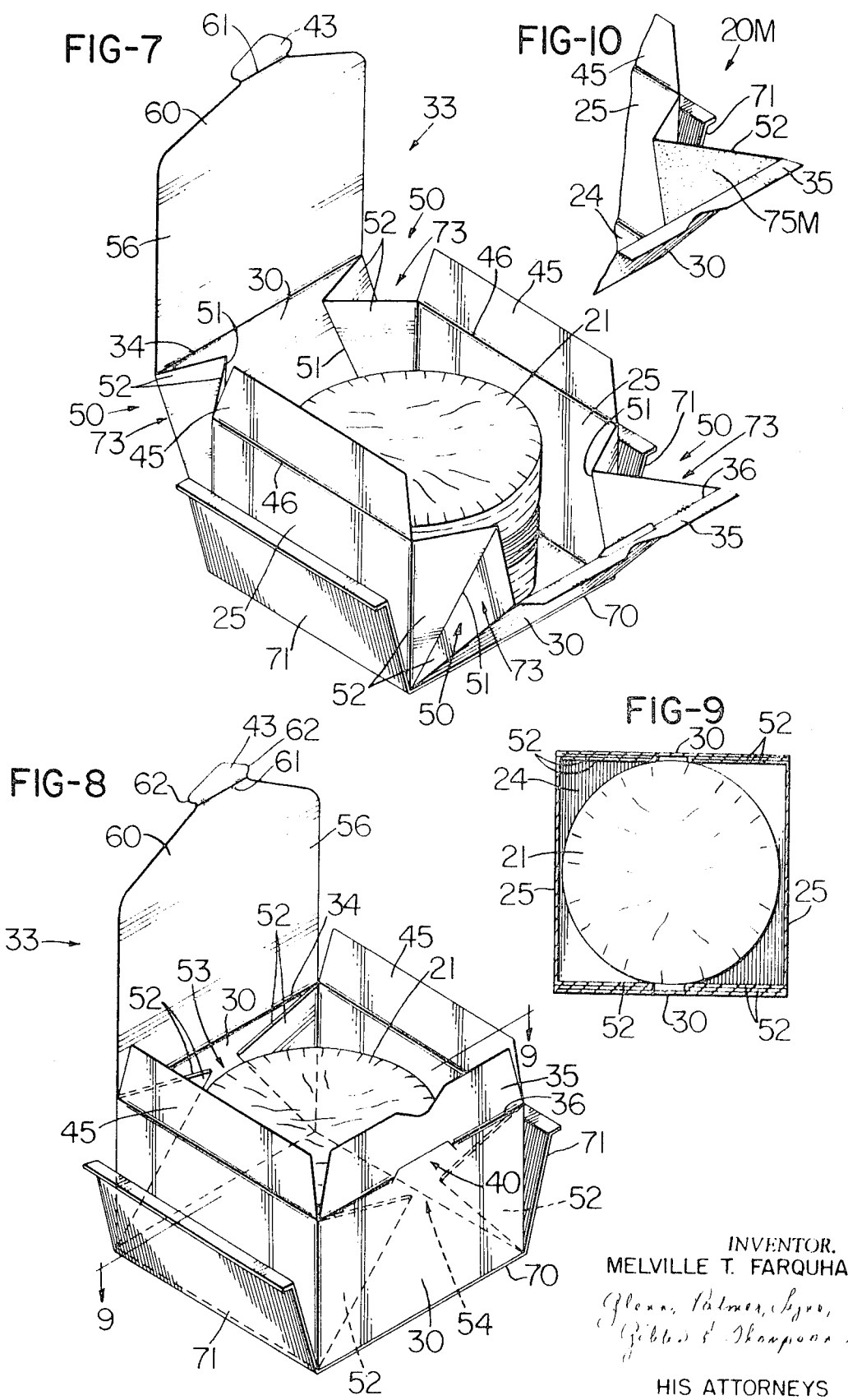

United States Patent Office 3,627,541
Patented Dec. 14, 1971

3,627,541
METHOD OF PACKAGING A FOOD PRODUCT IN A CARTON
Melville T. Farquhar, Bon Air, Va., assignor to Reynolds Metals Company, Richmond, Va.
Original application Nov. 21, 1968, Ser. No. 777,620. Divided and this application June 12, 1970, Ser. No. 45,616
Int. Cl. B65b 25/06
U.S. Cl. 99—171 R    3 Claims

ABSTRACT OF THE DISCLOSURE

A carton for a food product and blank for making same wherein such carton has a bottom wall, a pair of side walls adjoining opposite side edges of the bottom wall, a pair of end walls adjoining opposite end edges of the bottom wall, and a top wall extending from one of the end walls. The carton also has a plurality of interconnecting walls each interconnecting an end wall and a side wall, each interconnecting wall being folded to define a pair of adjoining overlapped panels with each pair of panels being arranged between an associated end wall and the food product to thereby effectively use the food product to hold the carton assembled, and upon unfastening the top wall and removing the food product the walls of the carton fall outwardly and the resulting structure defines a serving tray for the food product.

CROSS-REFERENCE TO RELATED APPLICATION

This application is a division of application Ser. No. 777,620, filed Nov. 21, 1968 now Pat. No. 3,542,569.

BACKGROUND OF THE INVENTION

Many food products such as hamburgers, roast beef sandwiches, and the like, are packaged in paper-like wrappers and sold to be eaten without plates, utensils, etc. Because the profit made by a retail establishment selling these types of food products may not be very high it is especially important that the packaging of these food products be achieved with maximum economy. In addition, it is believed that a retail establishment will sell more of a particular food product if the wrapper for such product is of such a character that it may be usable as a serving tray.

SUMMARY

This invention provides a simple and economical carton for a food product which may be rapidly assembled and may be used as a serving tray for the food product once such food product is removed.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a perspective view illustrating one exemplary embodiment of the carton of this invention in its assembled condition with a food product contained therewithin;

FIG. 2 is a perspective view illustrating the carton of FIG. 1 in its disassembled condition and defining a shallow dish-like serving tray shown as supporting a food product on the central portion thereof;

FIG. 3 is a perspective view of the bland used to make the carton of FIG. 1;

FIG. 4 is a perspective view of a fixture which may be utilized to enable a more rapid assembly of the blank of FIG. 3 to define the carton of FIG. 1;

FIG. 5 is a perspective view illustrating the manner in which the fixture of FIG. 4 may be utilized to fold and hold associated side walls upwardly about associated opposite side edges of a central rectangular bottom wall;

FIG. 6 is a perspective view illustrating a food product such as a roast beef sandwich supported in position on such bottom wall;

FIG. 7 is a perspective view illustrating the manner of folding each interconnecting wall provided between an associated side wall and end wall to define a pair of adjoining overlapped triangular panels;

FIG. 8 is a perspective view illustrating the end walls folded substantially vertically about associated end edges of the rectangular bottom wall and with each pair of overlapped triangular panels arranged between an associated end wall and the food product;

FIG. 9 is a cross-sectional view taken on the line 9—9 of FIG. 8 with the supporting fixture removed and with the food product shown in plan view; and FIG. 10 is a fragmentary perspective view of a corner portion of another exemplary carton of this invention which utilizes adhesive means to help hold the carton in its assembled condition.

DESCRIPTION OF ILLUSTRATED EMBODIMENTS

Reference is now made to FIG. 1 of the drawings which illustrates an exemplary carton of this invention which is designated generally by the reference numeral 20 and is particularly adapted for containing a food product 21 such as a hamburger, roast beef sandwich, or the like. The carton 20 is of simple and economical construction and once the carton is opened to remove the food product or sandwich 21 the vertical walls thereof fall outwardly so that the resulting structure defines a serving tray 22 for the food product, see FIG. 2 of the drawings, and as will be described in more detail subsequently.

As seen particularly in FIGS. 5–8 of the drawings the carton 20 comprises a rectangular bottom wall 24, a pair of side walls each designated by the reference numeral 25 adjoining opposite side edges 26 of the bottom wall 24 and a pair of end walls each designated by the reference numeral 30 adjoining opposite end edges 31 of the bottom wall 24. The side edges 26 and end edges 31 are defined by suitable fold lines provided in the material used to define the carton 20.

The carton 20 has a top wall 33 foldably connected to one of the end walls 30 along a fold line 34 and in the illustration of FIG. 5 the top wall 33 is foldably connected to the end wall 30 defining the left end of the illustrated carton. The top wall 33 has a swinging forward end which is adapted to be detachably fastened to the other end wall 30 to hold the carton 20 together as an assembly. Once the completed carton 20 has its top wall 33 unfastened and its sandwich 21 is removed, the walls 25 and 30 will fall outwardly toward the plane of the bottom wall to define the shallow dish-like serving tray 22 for the food product 21.

The carton 20 has an extension flap 35 foldably connected to the other of its end walls 30 along and extending outwardly of a fold or weakened line 36 and the extension flap 35 is adapted to be folded inwardly and substantially parallel to the bottom wall 24 to support the forward or swinging end portion of the top wall 33 with the carton 20 in its assembled condition. The end wall 30 which has the extension flap 35 foldably connected thereto has slit means designated generally by the reference numeral 40 provided therein and such slit means comprises a substantially U-shaped slit having a bight 41 and a pair of legs 42 extending from opposite ends of the bight 41 and in a direction generally toward the bottom wall 24. The bight 41 and a pair of aligned rectilinear score lines at opposite ends of the bight 41 define the weakened line 36. The top wall 33 has a locking tab 43 extending from the forward edge thereof and in the assembled carton 20 the locking tab 43 is inserted within the slit means 40 to detachably fasten the top wall 33 in position to hold the carton 20 assembled and in protective relation around the sandwich 21.

The carton 20 has a pair of side extension flaps 45 extending from its side walls 25 and each extension flap 45 is foldably connected to its associated side wall 25 along a fold line 46. The extension flaps 35 and 45 serve as backup flaps for the top wall and prevent the top wall 33 from being moved inwardly upon applying a load thereagainst.

The extension flaps 35 and 45 are comparatively short and extend outwardly from their associated fold lines only a small distance as compared to the overall height of their associated vertical wall. Thus, the extension flaps 35 and 45 provide support for the top wall 33 adjacent the peripheral top edges of the carton 20.

The carton 20 has a plurality of interconnecting walls each designated generally by the reference numeral 50 and each interconnecting wall interconnects an associated end wall 30 and a side wall 25. Each interconnecting wall 50 has a substantially V-shaped inner portion and a weakening line 51 extends across each interconnecting wall 50 and essentially bisects each wall 50 into two sections to define a pair of panels each designated by the reference numeral 52.

Each interconnecting wall 50 in this exemplary embodiment of the invention is in the form of a quadrilateral wall and each weakening line 51 diagonally bisects each wall 50 to define the panels 52 in the form of triangular panels having equal areas. Each interconnecting wall 50 is folded along its associated weakening line 51, as seen in FIG. 7, so that its associated triangular panels 52 are overlapped against each other and arranged substantially coplanar with an associated end wall 30 as shown at 53 and 54 for opposite ends of the carton 20, see FIG. 8.

The overlapped panels 52 engage the food product 21, see FIG. 9, and such food product holds the overlapped triangular panels 52 in position substantially coplanar with an associated end wall 30. With this construction and arrangement it will be appreciated that the side walls 25 cannot be moved outwardly and once the top wall 33 is fastened in position the end walls 30 are held together by such top wall whereby the carton 20 with its sandwich 21 will remain assembled.

The top wall 33 of the carton 20 is of optimum simplicity and comprises a rectangular rear portion 56 adjoining the fold line 34 and a substantially trapezoidal forward portion 60 adjoining the rectangular rear portion 56. The locking tab 43 has a base defined by a score line 61 which also defines the shorter parallel side of the trapezoidal forward portion 60.

The locking tab 43 is in the form of a wedge-shaped tab and has a pair of locking side projections 62 arranged outwardly of opposite ends of the base 61 of such tab whereby the locking tab 43 is easily fastened in position to assemble the carton 20 with its sandwich 21 inserted therewithin and once the tab 43 is fastened in position within the slit means 40 the projections 62 combined with the normal tendency of end walls 30 to move outwardly, assure the tab 43 will not be inadvertently unfastened. The tab 43 is also easy to unfasten by pulling such tab upwardly and substantially parallel to the end walls 30 and the comparatively narrow width of such tab assures easy unfastening during such upward pulling.

The carton 20 of this example utilizes a minimum amount of paperboard and except for the comparatively longer extension of the top wall 33 has a comparatively symmetrical configuration which lends itself for use as a serving tray for the food product 21. In particular, it will be seen that the bottom wall 24 has a square peripheral outline and the side walls 25 and end walls 30 have equal areas. In addition, interconnecting walls 50 are of identical areas and hence the triangular panels 52 are of equal areas. Thus, upon unfastening the top wall 33 to remove the sandwich 21 the serving tray 22, see FIG. 2, is defined and such tray is especially easy to handle inasmuch as its outer portions, with the exception of the top wall 33, are arranged substantially symmetrically around the bottom wall 24 while such outer portions extend approximately equal distances from the bottom wall 24.

The carton 20 may be formed in any suitable manner and made from any suitable foldable material and such carton is preferably formed from the exemplary blank 65 illustrated in FIG. 3 of the drawings. The blank 65 is made of paperboard, or the like, and may have a side such as an exposed surface thereof laminated with a moisture impervious material such as metallic foil which may be in the form of aluminum-containing metallic foil. The blank 65 preferably has the surface which is used to define the inside of the carton 20 comprised of a laminated metallic foil for reasons which will be described in more detail subsequently and either one or both surfaces of the blank 65 may be suitably colored, embossed, imprinted, or kept plain, as desired.

The description of blank 65 will proceed by describing only those structural portions which were not previously described in detail in connection with the detailed description of the carton 20 and where a previous detailed description was made in connection with the carton 20 such description will not be repeated in connection with the blank and corresponding component portions of the blank 65 will be designated by the same reference numerals as in carton 20.

The blank 65 is a single piece construction which is suitably cut and scored and adapted to be assembled to define the resulting carton 20 of this invention. The blank has a plurality of four substantially V-shaped score lines symmetrically provided therein and defining corner portions thereof. Each V-shaped score line is comprised of a leg portion 25L and 30L each defining an edge of a side wall 25 and an end wall 30 respectively. Further, it will be appreciated that each score line 25L and 30L defines an edge of an associated interconnecting wall 50.

The simplicity of construction of the blank 65 is readily apparent from FIG. 3 of the drawings and as previously mentioned. Thus, it will be seen that the shallow dish-like tray 22 defined upon disassembling the resulting carton 20 made from the blank 65 has its central portion defined by the square bottom wall 24 and a peripheral outer portion which is substantially symmetrically arranged around the bottom wall 24 whereby, as previously explained, an easily handled serving tray 22 is defined for the food product 21.

As indicated previously, the inside surface of the carton 20 and hence the corresponding surface of the blank 65 may be made of a moisture impervious material and in this example of the invention a layer of metallic foil may be laminated against the paperboard layer defining the structural portion of the blank 65. The metallic foil layer assures that moisture from the food product, such as the sandwich 21 carried within the resulting carton 20, formed upon assembling the blank 65, does not soak into and weaken the adjoining structural portion of the carton which is made of paper. It will be appreciated that a food product such as a sandwich may tend to drip liquids contained therein, such as condiments, for example, within the carton and if the inside layer were not made of a moisture impervious material there could be substantial local weakening of the paperboard material. Substantial weakening of the paperboard material could cause either collapse of the carton 20 or make such carton susceptible to be easily damaged by an object which might be easily pushed through a weakened wall. It will also be appreciated that by utilizing metallic foil to define the moisture impervious inside layer the foil also acts as a thermal barrier which would tend to keep a hot sandwich 21, for example, in a hot condition.

As previously suggested, the retail sale of food products such as hamburgers, roast beef sandwiches, and the like, is a very competitive one and it is important that operating costs be kept at a minimum while providing fast service for customers. The blank 65 lends itself to a fast method of packaging a food product such as a sandwich 21 and such packaging will now be described in connection with FIGS. 3-8 of the drawings.

In particular, it will be seen that the side walls 25 are raised upwardly about associated side edges 26 of the bottom wall and such side walls 25 may be supported in their raised positions using a fixture having a substantially U-shaped cross-sectional configuration and designated generally by the reference numeral 66, see FIG. 4. The fixture 66 enables easier folding of the interconnecting walls 50 and lifting of the end walls 30 in a manner as will now be described.

The blank 65 is supported in the fixture 66 so that its bottom wall 24 rests on the bottom wall 70 of such fixture and the side walls 25 are supported in their substantially vertical positions against the side walls 71 of such fixture, see FIG. 5. The sandwich 21 is then supported on the inside surface of the bottom wall 24 as illustrated in FIG. 6, and each interconnecting wall 50 is folded essentially as illustrated at 73 in FIG. 7 for a typical interconnecting wall 50 to define a pair of adjoining overlapped triangular panels 52 with the folding action taking place along an associated weakening line 51.

As the interconnecting walls 50 are folded inwardly the end walls 30 are folded upwardly about associated end edges 31 of the bottom wall 24 and simultaneously each pair of overlapped triangular panels 52 is arranged between an associated end wall 30 and the sandwich 21. This arrangement of the overlapped panels 52 effectively uses the sandwich 21 to hold the side walls 25 in an assembled condition and as best seen in FIGS. 8 and 9. With the walls 25 and 30 arranged substantially vertically the extension flaps 35 and 45 are then folded substantially horizontally and parallel to the bottom wall 24 and the top wall 33 is folded against the extension flaps 35 and 45. The locking tab 43 provided at the terminal swinging end of the top wall 33 is then inserted within the slit means 40 to define the completed carton 20 and such carton is illustrated in FIG. 1 of the drawings.

Thus it is seen that the above described packaging method enables packaging of a food product in a rapid manner and the food product itself is used to help hold the carton assembled. Further, upon unfastening the top wall 33 and removing the food product 21 from within the carton the walls 25 and 30 are free to fall outwardly toward the plane of the bottom wall 24 and the resulting structure defines the serving tray 22, see FIG. 2. It will also be noted that the tray 22 has a shallow dish-like construction which is assured by the nature of the various fold lines provided in the blank 65 from which the carton 20 is made.

The weakening line 51 provided in each interconnecting wall 50 may be formed utilizing any suitable technique and in this example of the invention the weakening line 51 is in the form of a cut-score line. Each cut-score line 51 is defined by a plurality of spaced slits arranged in a rectilinear path with score means provided between each immediately adjacent slit.

It will also be appreciated that the locking tab 43 provided at the swinging end of the top wall 33 need not necessarily be inserted within an associated slit means 40 provided adjacent the top edge of an associated end wall 30 as illustrated in the drawings. If desired, a suitable locking tab may be provided which extends downwardly along the outside surface of an associated end wall 30 with suitable cooperating slit means being provided beneath the top edge of such associated end wall.

A modification of the carton of this invention is illustrated in FIG. 10 of the drawings wherein only a fragmentary corner portion is shown in perspective view. The fragmentary portion of the carton illustrated in FIG. 10 will be designated generally by the reference numeral 20M and because the component parts of the carton 20M are identical to corresponding parts of the carton 20 such component parts will be given the same reference numerals. The only difference between the carton 20M of FIG. 10 and the carton 20 is that the carton 20M has means holding associated inside portions of each end wall 30 and an ajoining triangular panel 52 of each pair of panels together.

Any suitable holding means may be utilized and in this example of the invention a quick drying adhesive cement is provided and shown as a granular presentation which is designated generally by the reference numeral 75M. The holding means or adhesive 75M holds each pair of overlapped panels 52 flatly against its associated end wall 30 to thereby hold the carton together even after removal of the food product 21. The adhesive 75M is of such a character that the carton 20M may be easily disassembled merely by pulling outwardly on the end walls 30 to thereby define a serving tray substantially identical to the serving tray 22 illustrated in FIG. 2.

In those applications where the inside surface of the carton 20M is comprised of a layer of metallic foil, or the like, the adhesive 75M is of such a character that it will adhesively fasten adjoining surfaces of metallic foil. The holding means or adhesive 75M may be used in those applications where it is desired that the carton 20M will hold together even after unfastening the top wall 33 and removing the sandwich 21 yet such adhesive 75M is easily pulled apart to provide a dish-like serving tray.

While present exemplary embodiments of this invention, and methods of practicing the same, have been illustrated and described, it will be recognized that this invention may be otherwise variously embodied and practiced within the scope of the following claims.

What is claimed is:

1. A method of packaging a food product in a carton made from a single piece blank having a rectangular bottom wall, a pair of side walls adjoining opposite side edges of said bottom wall, a pair of end walls adjoining opposite end edges of said bottom wall, with one of said end walls having an extension defining a top wall extending therefrom, and a plurality of interconnecting walls each interconnecting an associated end wall and a side wall, said method comprising the steps of: raising said side walls upwardly about associated opposite side edges of said rectangular bottom wall; placing a food product on said bottom wall, said food product having a dimension between said end edges substantially equivalent to the corresponding dimension of said bottom wall therebetween; folding each interconnecting wall to define a pair of adjoining overlapped panels; lifting said end walls upwardly about associated end edges of said rectangular bottom wall; arranging each pair of overlapped panels between an associated end wall and said food product simultaneously during said lifting step to thereby use said food product to hold each pair of overlapped panels adjacent an associated end wall, said overlapped panels serving to hold said side walls in their raised positions and said carton in an assembled condition; folding said top wall substantially parallel to said bottom wall; and detachably fastening the terminal swinging end of said top wall against the other of said end walls to thereby use said top wall to hold said end walls in their lifted positions, said method enabling packaging of said food product in a rapid manner using said food product to hold said carton assembled and upon unfastening said top wall and removing said food product said side walls and end walls fall outwardly toward the plane of said bottom wall and the resulting structure defines a serving tray for said food product.

2. A method as set forth in claim 1 and further comprising the step of supporting said side walls in their raised positions using a substantially U-shaped fixture to enable easier folding of said interconnecting walls and easier lifting of said end walls.

3. A method as set forth in claim 1 in which said step of detachably fastening the terminal swinging end of said top wall against the other of said end walls comprises inserting a substantially triangular locking tab defining the terminal end of said top wall within a cooperating slit means provided in said other of said end walls to thereby detachably fasten said top wall in position.

References Cited

UNITED STATES PATENTS

| | | | |
|---|---|---|---|
| 915,177 | 3/1909 | Hilliker | 229—29 F |
| 1,694,126 | 12/1928 | Joslin | 229—31 X |
| 2,765,073 | 10/1956 | Murray | 229—29 F X |
| 3,008,626 | 11/1961 | Lawrence | 229—31 I |
| 3,146,933 | 9/1964 | Moore | 229—31 |

FOREIGN PATENTS

| | | | |
|---|---|---|---|
| 463,403 | 10/1913 | France | 229—31 |
| 874,616 | 8/1961 | Great Britain | 229—31 |

FRANK W. LUTTER, Primary Examiner

S. L. WEINSTEIN, Assistant Examiner

U.S. Cl. X.R.

99—174; 229—31 FS, 40